Patented Feb. 24, 1931

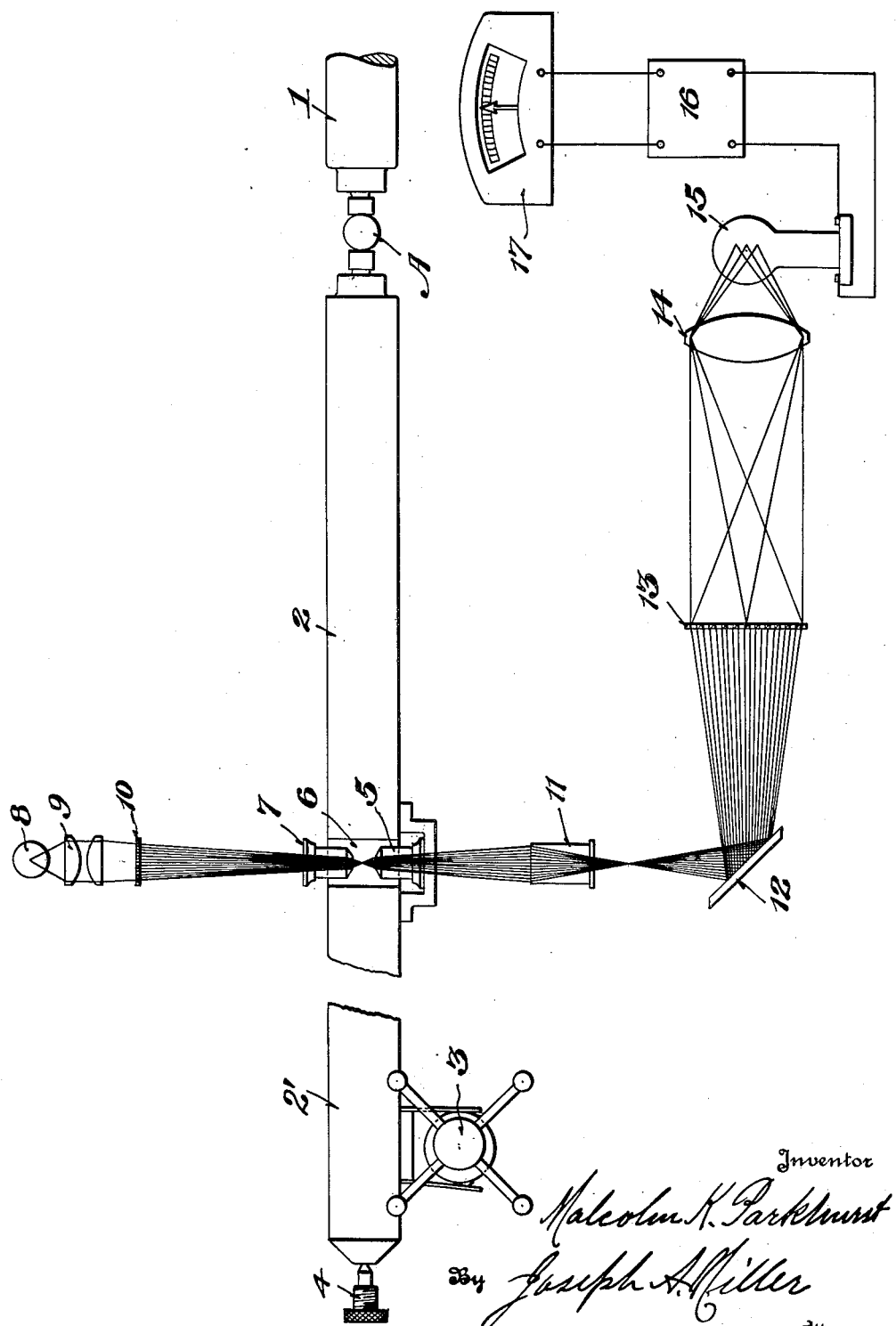

1,794,341

UNITED STATES PATENT OFFICE

MALCOLM K. PARKHURST, OF NEW YORK, N. Y., ASSIGNOR TO BROWN & SHARPE MFG. CO., OF PROVIDENCE, RHODE ISLAND

OPTICAL MEASURING DEVICE

Application filed December 28, 1928. Serial No. 328,983.

This invention relates to optical measuring devices, and the primary object thereof is to provide a novel measuring device in which the measurement is obtained by means of light rays which latter effect operation of a reading meter.

In the drawings, the figure is a side plan view of the invention.

In proceeding in accordance with the present invention, a fixed object engaging spindle or anvil 1 is employed, opposing which is a movable work engaging spindle 2, the latter being operable by any means such as the eccentric 3; an adjustable stop 4 being provided for the spindle 2. A movable objective 5 is affixed to the spindle 2 so as to partake of the movements thereof and is disposed in a cut out 6 in the spindle opposite to a fixed objective 7, the latter being stationarily secured and also projecting partly into the cut-out 6. A source of light 8 is aligned with the fixed objective 7, the light rays passing through condensers 9 and a screen or grating 10, the condensers and grating being interposed between the light 8 and the fixed objective 7, the parts 7, 8, 9 and 10 being disposed in a plane at right angles to the axis of the spindles. An eye piece or focusing member 11 is aligned with the fixed objective 7 and receives the light rays therefrom, the rays being projected onto a reflector 12 which latter in turn deflects the rays through a second screen or grating 13, the latter being of similar or greater size than that of the grating 10. The light rays after passing through the grating 13 are passed through a condenser 14 and from the latter the rays pass to a photoelectric cell 15. The photoelectric cell acts first upon an amplifier 16 and then on a meter 17 which latter embodies the usual dial so that the readings of the measurements can be taken.

In operation the light from the source 8 passes through the condensers 9 and through the small screen or grating 10, to the fixed objective. The piece of work A to be measured is placed between the confronting ends of the spindles 1 and 2, whereupon the latter spindle is moved against the work, which latter is thus held clamped between the two spindles. The movement of the spindle 2 causes movement of the objective 5, which is carried thereby, relative to the fixed objective 7, the image of the screen being passed through the focusing eye piece 11 and being deflected by reflector 12 through the openings of the larger grating 13, the rays from the grating 13 being picked up by the lens 14 and entering the photoelectric cell, establish a circuit, which latter is amplified by the amplifier 16 and operates the meter 17. As the spindle 2 is moved, the indicator has a plus reading until the spindle contacts with the work, and if the latter is the masterpiece the reading would be on the zero point or absolute center of measurement. If the work is larger than the masterpiece, the meter will indicate a plus reading. On the other hand, if the work is smaller than the masterpiece, the spindle 2 will be moved a greater distance or beyond the zero mark, and indicate a minus reading on the meter.

As shown in the drawing a portion of the work spindle 2 is removed for the purpose of illustrating the positions assumed by the work spindle. To the left the spindle is shown by 2' as in contact with the adjustable stop 4 and that portion of the spindle 2 to the right of the break is shown in contact with the master piece of work A, thus bringing the beam of light in the central position as shown and the indicator arrow on the center of zero point.

Having thus described my invention what I claim as new and desire to secure by Letters Patent is:—

1. In an optical measuring device, in combination with a fixed and a movable object holder adapted to hold the object therebetween, a movable objective carried by the movable holder, a relatively fixed objective disposed opposite to the movable objective, a source of light aligned with the fixed objective, condensers and a grating interposed between the source of light and the objective, an eye piece aligned with the objectives, a reflector aligned with the eye piece for deflecting light rays from the eye piece, a grating larger than the first named grating to receive the light rays from the reflector, a lens and photoelectric cell for receiving the light rays from the grating, and a meter for recording the light rays from the photoelectric cell.

2. In an optical measuring device, in combination with a fixed and a movable object holder adapted to hold the object therebetween, a movable objective carried by the movable holder, a relatively fixed objective disposed opposite to the movable objective, a source of light aligned with the fixed objective, means to condense the rays from the source of light, a grating between the fixed objective and the condensing means, a grating larger than the first named one, means to direct the light rays from the movable objective onto the larger grating, a meter, and means operable by the light rays from the larger grating to actuate the meter.

3. In an optical measuring device, movable work engaging means having an objective movable therewith, a fixed objective, a screen associated with the fixed objective, a screen associated with the movable objective, a source of light arranged to transmit its rays through the first screen and both of the objectives, means to transmit the light rays from the movable objective through the second screen, a meter, and electrical means operable by the light rays passing through the second screen to operate the meter.

4. In an optical measuring device, movable work engaging means having an objective movable therewith, a fixed objective, a meter, electrical means to energize the meter, a source of light arranged to transmit its rays from said source through both objectives and to said energizing means, and a screen associated with each objective to vary the direction of the rays transmitted to said energizing means in accordance with the relative positions of the objectives.

5. In an optical measuring device, movable work engaging means having an objective movable therewith, a fixed objective, a meter, electrical means to energize the meter, a source of light arranged to transmit its rays from said source through both objectives and to said energizing means, and means to vary the direction of the light rays to energize said energizable means in accordance with the relative positions of the objectives.

6. In an optical measuring device, movable work engaging means having an objective movable therewith, a fixed objective, a meter, a source of light arranged to transmit its rays through both objectives, and means for varying the position of the light rays in accordance with the relative positions of the objectives thereby to actuate said meter.

7. In an optical measuring device, movable work engaging means, a meter, a source of light, light intercepting means having a plurality of light passages and associated with and movable by the work engaging means and light responsive means to operate the meter in accordance with the position of the light intercepting means.

8. In combination with movable work engaging means, a fixed objective, a movable objective, means to effect movement of the movable objective by the movements of the work engaging means, a meter, a source of light, and means to pass the light rays from said source through both objectives and to operate the meter in accordance with the relative positions of the objectives.

9. In combination with movable work engaging means, a source of light, light screening means having a plurality of light passages receiving light from said source, an indicator operable by the light rays from said source, and means operable by the work engaging means to vary the position of the light rays through the screen means and thereby to accordingly vary the indicator movements.

10. In an optical measuring device, a movable work engaging member having an opening therethrough, a movable objective carried by said member and extending into said opening, a relatively fixed objective supported exteriorly of said member and extending into said opening, a source of light, means to condense the rays from the source of light, a grating interposed between the fixed objective and the condensing means, a meter, and means operable by the light rays from said grating to actuate the meter.

In testimony whereof I have signed my name to this specification.

MALCOLM K. PARKHURST.